2,896,656

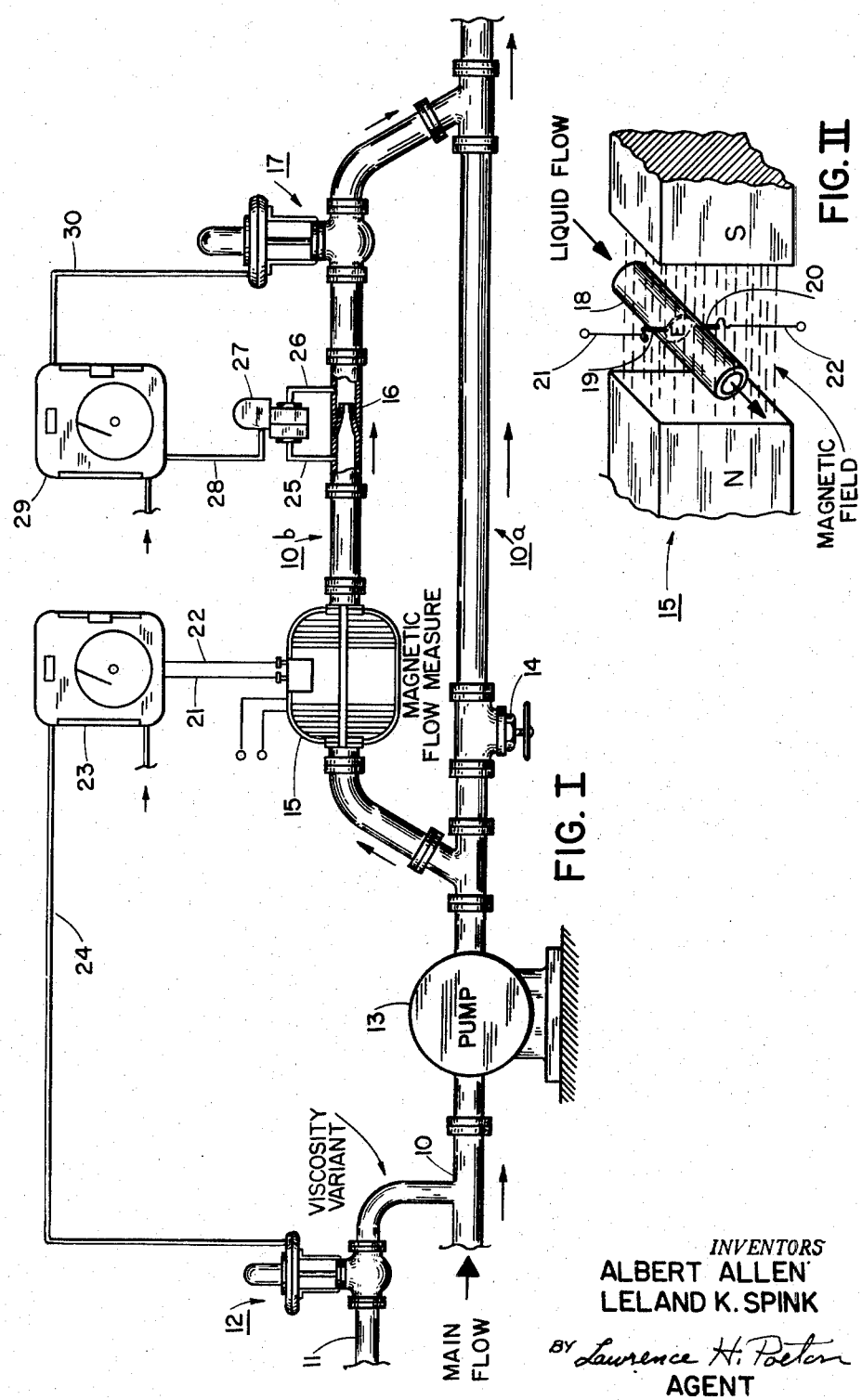

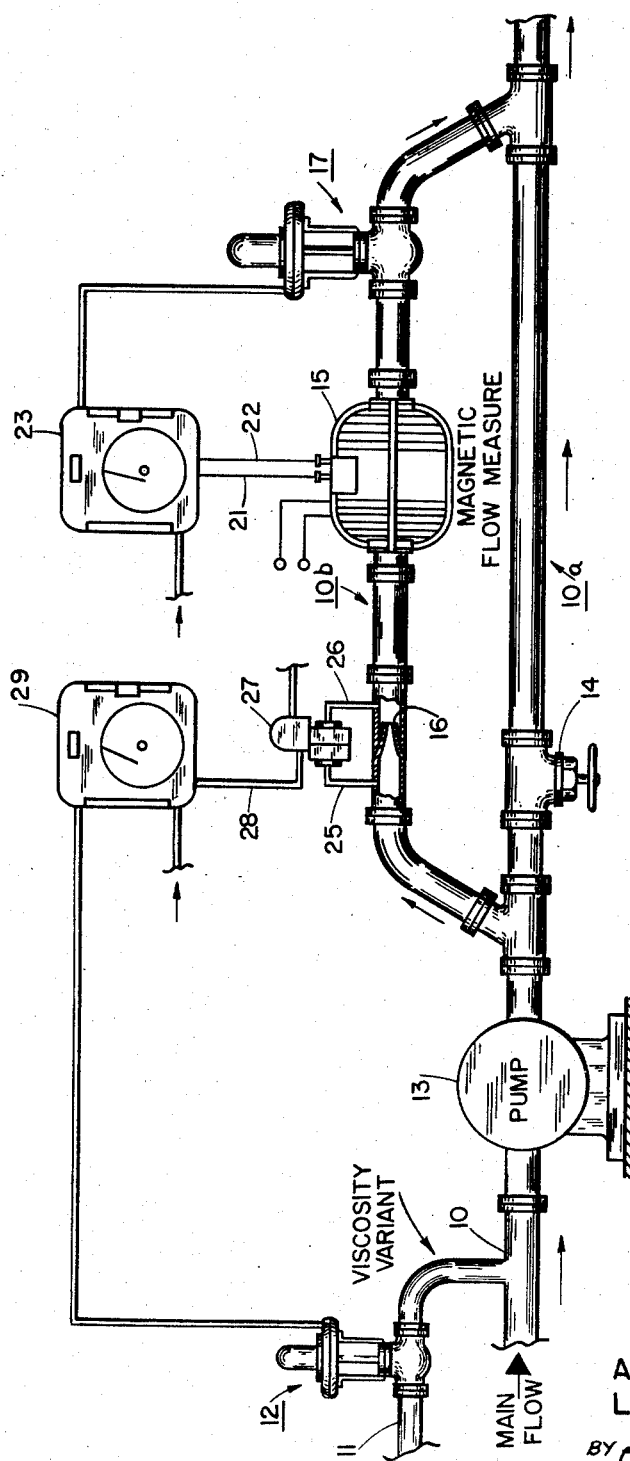

VISCOSITY MEASUREMENT SYSTEM

Albert Allen, Sharon, and Leland K. Spink, Foxboro, Mass., assignors to The Foxboro Company, Foxboro, Mass., a corporation of Massachusetts Application March 15, 1956, Serial No. 571,758

1 Claim. (Cl. 137—92)

This invention relates to devices for measuring the viscosity of a flowing liquid, and has particular reference to such devices wherein viscosity changes in the liquid are translated into changes of some other condition such as differential pressure, or volumetric flow, and wherein thereafter such "other condition" changes are measured as a means of obtaining representations of the viscosity changes.

In the past, for example, two flowmeters have been used in series for the above purpose. In such an arrangement one flowmeter controls the flow to maintain a fixed predetermined reading of this flowmeter notwithstanding viscosity changes in the liquid, and the consequent variation of the reading of the other flowmeter is used as a means of obtaining a representation of viscosity changes in the flowing body. A substantial disadvantage in such systems is that the flowmeter system thus used in the past has an error therein because both of the flowmeters which are used introduce some form of an obstacle or restriction into the flow line. Thus, in such prior art systems where a differential pressure measurement is taken across a flow nozzle, for example, when the viscosity of a flowing liquid changes, even if the flow were controlled to a constant volumetric value, the differential pressure would change. Thus where the differential pressure of one such flowmeter is held constant during viscosity changes, a reading of the second differential pressure flowmeter would represent a combination of flow change and viscosity change. Some flowmeters, such as those with movable elements in the flow line, reduce this effect but the disadvantage is still present in substantial degree directly or in range limitation.

The system of this invention obviates this prior art disadvantage by utilizing, as one of its flowmeter units, a magnetic volumetric flow sensing device whose operation is based on Faraday's law of electromagnetic induction. With this arrangement volumetric flow may be measured without physical interference with the flow itself, that is, without any device protruding into the flow pipe line. On this basis, output signals from such a system may be made essentially wholly attributal to viscosity changes.

This invention is illustrated herein in two general arrangements. On the one hand, a constant differential pressure is maintained so that the volumetric flow varies according to viscosity changes only, and on the other hand a constant volumetric flow is maintained so that a differential pressure measurement varies according to viscosity changes only.

Applications of the continuous process viscosity measurement include manufacturing processes for making paper, paints, ink, and the like, as long as density variants do not mask out viscosity variants, and as long as the flowing body is sufficiently electrically conductive to support the use of the electromagnetic induction flow measuring device. The range of such conductivity is of the order of 20 to 100,000 micromhos.

It is therefore an object of this invention to provide a new and improved viscosity measurement system.

Other objects and advantages of this invention will be in part apparent and in part pointed out hereinafter and in the accompanying drawings, wherein:

Figure I is a schematic showing of a viscosity measurement system which is an illustrative embodiment of this invention;

Figure II is a diagram of illustration of the principle of operation of the magnetic flow sensing device used in this invention; and Figure III is an alternate arrangement of the system of Figure I.

The Figure I showing is a viscosity measuring system with a viscosity control feature. This system comprises a main flow pipe 10, through which a liquid is flowed, from left to right. This liquid must be at least somewhat electrically conductive and may be a single liquid, a liquid mixture, suspension, or solution, in which semisolids or relatively small solids may be contained. At the left of the drawing a branch pipe 11 enters on the main flow pipe 10, and is used to apply a liquid to the main flow of liquid as a means of varying or "adjusting" the viscosity of the main flow of liquid. The nature of the branch pipe liquid is a matter of choice with respect to the desired viscosity, and the ability to so join with the main flow pipe liquid as to change the viscosity of the main flow pipe liquid. For example, in a paper mill process, where the main flow pipe liquid is a pulp suspension in water, the thickness of this suspension, i.e., in effect its viscosity, may be varied by adding or withholding water by means of the branch pipe 11. A pneumatically operated valve 12 is provided in the branch pipe 11 as a means of controlling the branch pipe flow and therefore the viscosity of the main flow of liquid, in the main flow pipe 10.

In Figure I, downstream of the branch pipe 11 entrance on the main pipe 10, a pump 13 is provided simply as a means of pushing the liquid along, that is, it need not be a constant volumetric flow producing pump, since the liquid flow is normally otherwise controlled.

The main pipe line, beyond the pump 10, is preferably divided into two parallel pipe lines 10a and 10b. With this arrangement, the main liquid flow will pass through the line 10a, essentially unimpeded except for a valve 14. A sufficient restriction is thus provided to assure an effective sampling flow through the parallel pipe 10b. The sampling pipe 10b is provided with a magnetic flow sensing unit 15, a flow nozzle 16, and a pneumatically automatic flow control valve 17.

The magnetic unit 15 is the previously mentioned flow sensing device which operates on the basis of Faraday's law of electromagnetic induction. The principles of operation of this device are illustrated in Figure II. A magnetic field is provided between magnetic poles, with a nonmagnetic metal tube 18 between the poles and axially perpendicular with respect to the magnetic field. Electrodes 19 and 20 are mounted on opposite sides of the tube 18 in a line which is also perpendicular to the magnetic field, with the electrodes 19 and 20 each in end flush relation with the inner wall of the tube 18. The tube 18 is a continuation of the Figure I liquid flow pipe 10b. Thus the voltage E induced in a conductor (flowing liquid within the tube 18) of fixed length (the inside diameter of the nonmetallic tube 18) moving through the magnetic field, is proportional to the velocity (rate of liquid volumetric flow) of the conductor. The voltage E is generated in a plane which is mutually perpendicular to both the velocity of the conductor and the magnetic field. The voltage E is taken off by conductors 21 and 22, which are also shown in Figure II. While a D.C. arrangement is used as an illustration, it is within the intended scope of this invention to use an A.C. arrangement.

Since the magnetic unit 15 has no devices or parts intruding in the liquid flow, it does not introduce errors by interfering with the flow. Further, since average velocity is directly proportional to volume rate of flow, the magnetic unit 15 measures volume rate of flow at the flowing temperature, independent of viscosity, density, turbulence, and suspended material.

In the Figure I embodiment, the output of the magnetic flow sensing unit 15 is electrically applied through the conductors 21 and 22 to a suitable, generally conventional control instrument 23 which, in turn, provides a pneumatic output through an output through an output pipe 24 to a branch line valve 12. Thus the application of the viscosity variant liquid to the main flow liquid is controlled in accordance with the flow measurement of the magnetic unit 15.

The liquid flow in the Figure I sampling pipe 10b is controlled by means of a system 25, which may be termed a restrictor type differential pressure producing flow measuring unit, including the nozzle 16 and the valve 17. Reference herein and in the claims to a "restrictor type differential pressure producing flow measuring unit" is intended to encompass any arrangement which so interferes with the flowing liquid as to produce a differential pressure variant due to viscosity change as well as to volumetric flow change i.e., arrangements using an orifice plate under certain flow conditions, a flow nozzle, a wavy pipe, a Pitot tube or other impact device, or the like. At the nozzle 16, a pair of pressure taps 25 and 26 are conventionally mounted and are used to apply the nozzle differential pressure to a differential pressure sensing unit 27. The output of the unit 27 is a pneumatic signal, in a pipe 28, which is applied to a suitable, generally conventional control instrument 29 which provides a pneumatic output in a pipe 30 as a means of controlling the valve 17. Thus the liquid flow in the sample pipe 10b is controlled by the valve 17 according to the differential pressure across the flow nozzle 16. In the Figure I embodiment of this invention the above flow control is so arranged as to maintain a predetermined constant differential pressure across the flow nozzle 16.

The Figure I system operates as follows: when for any reason the main liquid flow viscosity is changed, the flow through the sample pipe 10b is naturally changed accordingly. This flow change is especially marked and appreciable through the flow nozzle 16, with the result that the differential pressure across the flow nozzle 16 tends to change. However, the system operates automatically to control the flow nozzle differential to a predetermined value, so a new flow value is established through the nozzle 16 at the same pressure differential but according to the new viscosity value. Thus the magnetic flow measuring unit 15 measures the sample pipe liquid volumetric flow change as the difference between the original flow and the new sample pipe flow established by the nozzle 16 differential pressure control according to the new viscosity value. Consequently, the output of the magnetic unit 15 represents a volumetric flow change essentially wholly representative of the viscosity change, and the branch pipe valve 12 is operated as a means of adjusting the viscosity back to the original, predetermined viscosity value.

In this fashion the viscosity of a flowing fluid can be continuously and accurately controlled.

The Figure III system is a variation of the arrangement of the Figure I system. In the Figure III system it is indicated that the volumetric flow in the sample pipe may be controlled to a predetermined value by a combination of the magnetic unit 15 and the valve 17, and that the viscosity adjustment may be accomplished by the operation of the branch pipe valve 12 according to the differential pressure change across the flow nozzle 16 which results when the flowing liquid viscosity changes and the sample pipe volumetric flow is controlled to a predetermined value.

This invention, therefore, provides a new and improved viscosity measurement system.

As many embodiments may be made of the above invention and as changes may be made in the embodiments set forth above, without departing from the scope of the invention, it is to be understood that all matter hereinbefore set forth or shown in the accompanying drawings is to be interpreted as illustrative only and not in a limiting sense.

We claim:

A system wherein the viscosity of an electrically conductive flowing liquid is continuously measured and controlled, said system comprising a main flow pipe for carrying said liquid, a pump in said pipe for impelling said liquid therealong, a viscosity variance pipe entering said main flow pipe upstream of said pump whereby said pump acts as a viscosity additive mixing device in said main flow pipe, a control valve in said viscosity variance pipe, a branch pipe from said main flow pipe at a point downstream of said pump, a restrictor valve in said main flow pipe downstream of said branch pipe take-off point for so restricting said main flow pipe as to provide a full liquid flow through said branch pipe, a re-entry of said branch pipe into said main flow pipe downstream of said restrictor valve, a flow control system in said branch pipe, said flow control system comprising a magnetic flow meter flow sensing unit in said branch pipe in a continuation of said pipe in diameter, open to full flow therethrough and responsive only to volumetric flow of said liquid therethrough without flow disturbing structure and without viscosity change response, a control instrument operable by the output of said magnetic flow meter sensing unit, and a control valve in said branch pipe downstream of said magnetic flow meter sensing unit, said flow control valve being connected to said control instrument for operation thereby, a restrictor nozzle in said branch pipe upstream of said magnetic flow meter flow sensing unit, said nozzle comprising an upstream branch pipe diameter entrance, an inwardly tapering downstream extending body terminating in a truncation of said taper to provide a relatively small downstream nozzle exit disposed centrally of said branch pipe and spaced from the inner walls thereof, a pair of pressure taps in and open to said branch pipe, one upstream and one downstream of said restrictor nozzle, a differential pressure unit to which said flow taps are connected to operate said unit in accordance with the differential pressure across said restrictor nozzle and consequently responsive to both flow and viscosity changes in said branch pipe, a viscosity control instrument responsive to the output of said differential pressure unit, and an operating connection from said viscosity control instrument to said viscosity control valve in said viscosity variance pipe, whereby said flow control system maintains a constant flow in said branch pipe without viscosity change error in said flow control system, and whereby a true constant flow is provided in said viscosity control system which accordingly responds in terms of differential pressure to the viscosity changes only, in said liquid in said branch pipe, to adjust said viscosity variance valve to the degree necessary to maintain constant viscosity in said liquid in said main flow pipe.

References Cited in the file of this patent

UNITED STATES PATENTS

| | | |
|---|---|---|
| 1,604,672 | Albersheim et al. | Oct. 26, 1926 |
| 1,963,011 | Albersheim et al. | June 12, 1934 |
| 2,149,847 | Kolin | Mar. 7, 1939 |
| 2,315,805 | Mayo et al. | Apr. 6, 1943 |
| 2,446,283 | Hulsberg | Aug. 3, 1948 |
| 2,491,445 | Cunningham et al. | Dec. 13, 1949 |
| 2,665,707 | Stover | Jan. 12, 1954 |
| 2,757,538 | Soffel | Aug. 7, 1956 |

FOREIGN PATENTS

| | | |
|---|---|---|
| 657,696 | Great Britain | Sept. 26, 1951 |